(12) United States Patent
Chu

(10) Patent No.: US 6,388,408 B1
(45) Date of Patent: May 14, 2002

(54) MOTOR CURRENT SENSING IN ELECTRIC POWER TOOLS

(75) Inventor: Raymond Wai Hang Chu, Chai Wan (HK)

(73) Assignee: Defond Manufacturing Limited, Chai Wan (HK)

( * ) Notice: Subject to any disclaimer, the term of this patent is extended or adjusted under 35 U.S.C. 154(b) by 0 days.

(21) Appl. No.: 09/738,841

(22) Filed: Dec. 18, 2000

(51) Int. Cl.[7] .............................................. H02P 23/68
(52) U.S. Cl. ......................... 318/434; 310/23; 361/78; 361/87; 361/147; 361/31; 361/93; 307/24; 324/117 H; 324/117 R
(58) Field of Search ........................... 310/23; 318/434; 361/78, 87, 147

(56) References Cited

U.S. PATENT DOCUMENTS

| | | | | |
|---|---|---|---|---|
| 3,579,037 A | * | 5/1971 | Hackman et al. ............ | 310/87 |
| 3,648,111 A | * | 3/1972 | Howe ........................... | 361/50 |
| 3,846,688 A | * | 11/1974 | Perloff ......................... | 307/126 |
| 4,243,982 A | * | 1/1981 | Yarbrough ................... | 340/664 |
| 4,825,029 A | * | 4/1989 | Otto ............................ | 219/69.1 |
| 5,066,904 A | * | 11/1991 | Bullock ....................... | 323/357 |
| 5,229,909 A | * | 7/1993 | Tessmer et al. ............. | 361/103 |
| 5,502,374 A | * | 3/1996 | Cota ........................... | 324/119 |
| 5,896,257 A | * | 4/1999 | Takahashi .................... | 361/31 |
| 6,055,142 A | * | 4/2000 | von Keudell et al. ....... | 361/115 |

* cited by examiner

*Primary Examiner*—Robert E. Nappi
*Assistant Examiner*—Rita Leykin
(74) *Attorney, Agent, or Firm*—Leydig, Voit, & Mayer, Ltd.

(57) ABSTRACT

A device for sensing motor current for over-current protection in an electric power tool. The tool includes an electric motor supplied with electrical power via a live cable and incorporates over-current protection including a tripping circuit with a current sensor associated with the live cable. The device includes a toroid of the sensor and two cable segments connected in parallel to a section of the live cable such that the motor current will be distributed among the cable segments and live cable section in respective proportions. The toroid extends around one cable segment for sensing the respective proportion of the motor current.

14 Claims, 1 Drawing Sheet

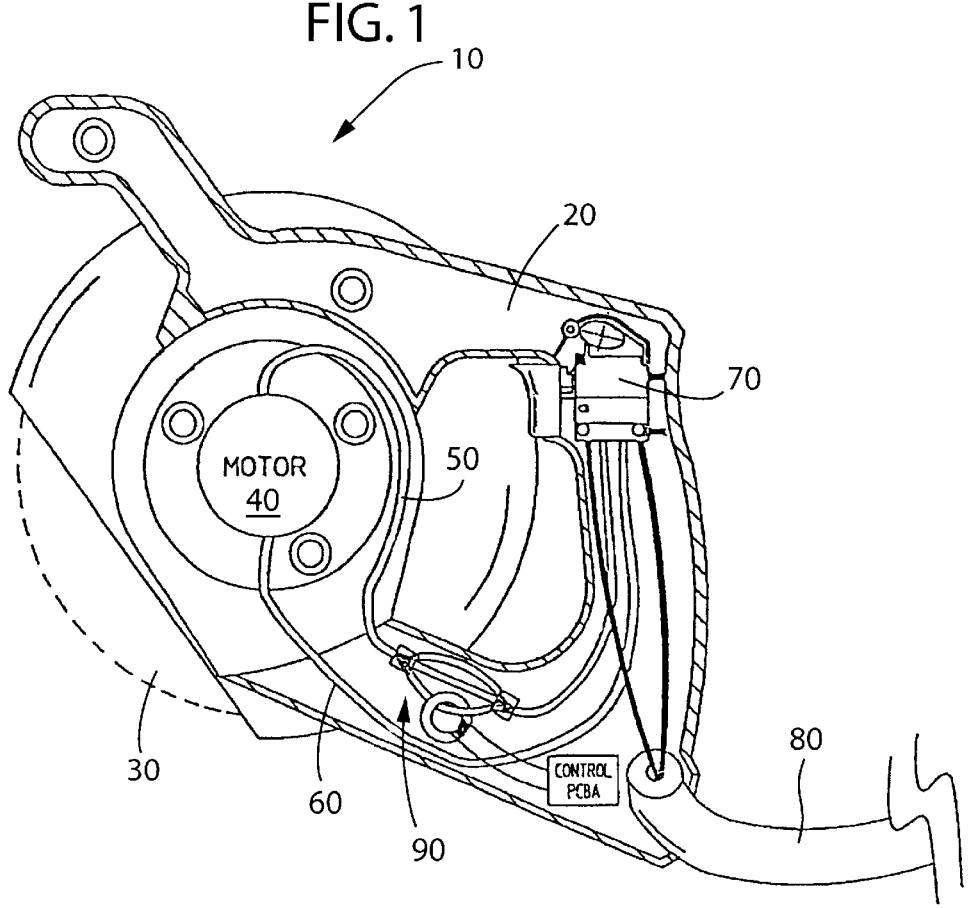
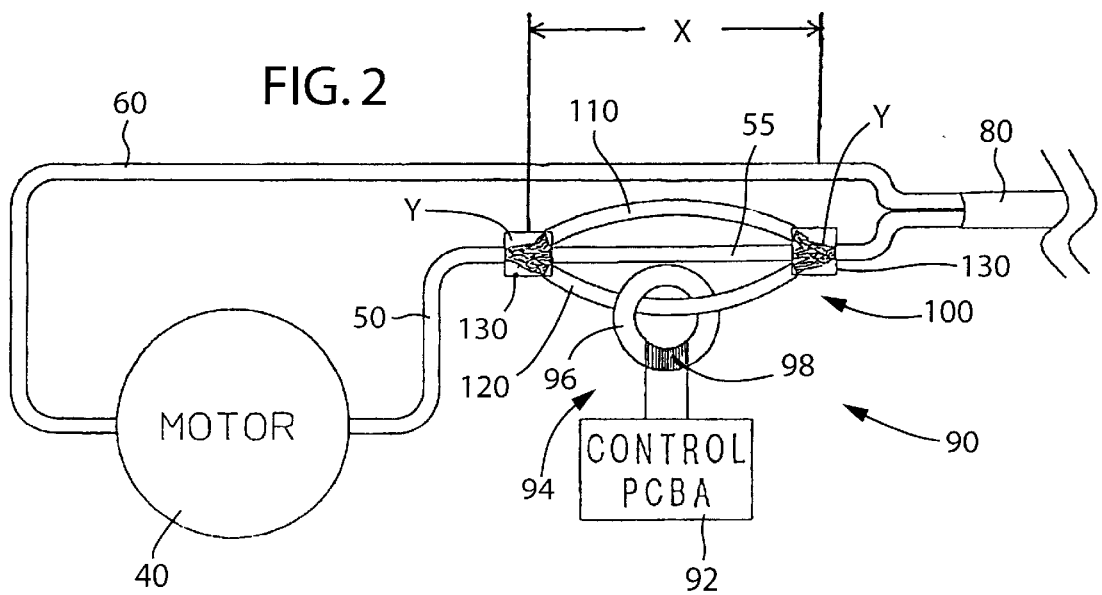

MOTOR CURRENT SENSING IN ELECTRIC POWER TOOLS

The present invention relates to a device for and a method of sensing motor current in an electric power tool.

BACKGROUND OF THE INVENTION

Most electric power tools incorporate an electric motor as the source of mechanical power. The motor current will surge exponentially when the motor is stalled as a result of mechanical obstruction, which can be hazardous and therefore over-current protection is often employed.

In a typical arrangement, the over-current protection is implemented by a tripping circuit incorporating a current transformer including a toroid and a winding. The toroid extends around the live cable of the motor to detect or sense the motor current for output at the winding. Whenever the motor current rises to a dangerous level, the tripping circuit will come into action and switch off the electrical power supplied to the motor.

The current transformer tends to be bulky in size and/or expensive if it is required to handle a relatively large motor current, for example, up to or beyond 30A.

The invention seeks to mitigate or at least alleviate such a problem by providing an improved device for and method of sensing motor current in an electric power tool.

SUMMARY OF THE INVENTION

According to a first aspect of the invention, in an electric power tool comprising an electric motor supplied with electrical power via a live cable and incorporating over-current protection implemented by a tripping circuit including a current sensor associated with the live cable, there is provided a device for sensing the motor current for over-current protection. The device comprises a part of the sensor and at least one cable segment having opposite ends connected in parallel to a section of the live cable across two junctions such that the motor current will be distributed between the cable segment and the live cable section in predetermined proportions. The sensor part extends around one of the cable segment and the live cable section for sensing the respective proportion of the motor current.

Preferably, the cable segment has substantially the same electrical resistance per unit length as said live cable section.

It is preferred that the cable segment have substantially the same length as the live cable section.

It is further preferred that the cable segment have substantially the same electrical resistance per unit length as the live cable section. Preferably, the sensor part extends around the cable segment.

In a preferred embodiment, the motor current sensing device comprises two cable segments, each of which has substantially the same electrical resistance as the live cable section.

According to a second aspect of the invention, in an electric power tool comprising an electric motor supplied with electrical power via a live cable and incorporating over-current protection implemented by a tripping circuit including a current sensor associated with the live cable, there is provided a method of sensing the motor current for over-current protection, The method comprises providing at least one cable segment having opposite ends, and connecting the cable segment at opposite ends in parallel to a section of the live cable across two junctions such that the motor current will be distributed between the cable segment and the live cable section in predetermined proportions. The method includes arranging a part of the sensor to extend around one of the cable segment and the live cable section for sensing the respective proportion of the motor current.

It is preferred that the junctions are made by way of spot welding.

Preferably, providing at least one cable segment includes choosing the cable segment to have substantially the same electrical resistance per unit length as the live cable section.

It is preferred that providing at least one cable segment includes choosing the cable segment to have substantially the same length as the live cable section.

It is further preferred that providing at least one cable segment includes choosing the cable segment to have substantially the same electrical resistance per unit length as the live cable section.

Preferably, the step of arranging the sensor part is to arrange the sensor part to extend around the cable segment.

In a preferred embodiment, providing at least one cable segment comprises providing two said cable segments having substantially the same electrical resistance as the live cable section.

It is preferred that the step of connecting the cable segment comprises making the junctions by way of spot welding.

BRIEF DESCRIPTION OF DRAWINGS

The invention will now be more particularly described by way of example only, with reference to the accompanying drawings, in which:

FIG. 1 is a cross-sectional side view of an electric power tool incorporating an embodiment of a motor current sensing device in accordance with the invention, which is provided according to a motor current sensing method embodying invention; and FIG. 2 is a wiring diagram of the motor current sensing device of FIG. 1

DETAILED DESCRIPTION OF PREFERRED EMBODIMENT

Referring to the drawings, there is shown an electric power tool in the form of a hand-held electrical saw 10 incorporating a motor current sensing device 100 provided according to a motor current sensing method, embodying the invention. The electric saw 10 comprises a housing 20, a circular saw blade 30 supported by the housing 20 for rotation, and an electric motor 40 for driving the saw blade 30. Live and neutral power cables 50 and 60 are used for connecting the motor 40 to a mains power source via a pull-trigger switch 70 and a power cord 80.

The electric saw 10 includes a tripping circuit 90 which is associated with the live cable 50 for over-current protection in relation to the motor 40. The tripping circuit 90 comprises a control circuit 92 including a relay or triac (not shown) mounted on a printed circuit board, and a current transformer 94. The transformer 94 includes a toroid 96 and a coil or winding 98 which is wound on the toroid 96 and connected to the control circuit 92.

Although not shown in the drawings, the live cable 50 connects the motor 40 via the triac. The triac is to be turned off by the control circuit 92 for disconnecting the motor 40 from the mains power source in the event that the current in the motor circuit rises to an unacceptably high level. If desired, both of the live and neutral cables 50 and 60 may be switchable by respective triacs or the like.

The motor current sensing device 100 comprises two relatively short cable segments 110 and 120 connected in parallel with each other and to a selected section 55 of the live cable 50, and includes the winding 98 of the current transformer 94 The two cable segments 110 and 120 preferably have substantially the same length X as the live cable section 55.

The live cable section 55 is formed by stripping off the insulating shield of the live cable SS at two positions spaced a distance X apart to form a pair of junctions Y, to which opposite ends of each of cable segments 1 10 and 120 are connected respectively. The connection at each junction Y may be made by any suitable means, such as crimping, soldering or, as in this particular embodiment, spot welding through the use of a copper plate 130.

The two cable segments 110 and 120 are preferably chosen to be of the same specific type of cable as the live cable 50, such that the three cables have the same electrical resistance per unit length. As the cable segments 110 and 120 and the live cable section 55 are also substantially the same length X, the three current paths have substantially the same electrical resistance. This arrangement will result in even distribution of the current supplied to the motor 40 among the live cable section 55 and cable segments 110 and 120, such that only one-third of the motor current will flow along each cable section/segment 55/110/120.

The toroid 96 extends around the cable segment 120, i.e., this cable segment 120 passes through the toroid 96, for sensing a one-third proportion of the motor current. As the current transformer 94 is only required to handle a portion of the motor current, its size and/or cost can be significantly reduced. In the case of the electric saw 10, the maximum tolerable motor current is 30 A, and the current transformer 94 is only required to handle a maximum current of 10A, the tripping circuit 90 will trip at a larger current.

It is envisaged that only one of the cable segments 110 and 120, or more than two cable segments may be used in the subject sensing device or provided for according to the subject sensing method. Also, the cable segments 110 and 120 may be different from the live cable section 55, in terms of either their resistance per unit length (conducting cross-sectional area) or their lengths (as between the two junctions Y), provided that their individual resistances are known. Further, the current transformer 94 may alternatively be arranged to measure the current of the live cable section 55.

The invention has been given by-way of example only, and various other modifications of and/or alterations to the described embodiment may be made by persons skilled in the art without departing from the scope of the invention as specified in the appended claims.

What is claimed is:

1. In an electrical power tool comprising an electrical motor supplied with electrical power via a live cable, over-current protection including a tripping circuit comprising:
   a current sensor associated with the live cable,
   a device for sensing the motor current for over-current protection, which comprises a part of the current sensor and
   at least one cable segment having opposite ends connected in parallel to a section of the live cable across two junctions such that the motor current will be distributed between the cable segment and the section of the live cable in respective proportions, wherein the sensor part extends around one of the cable segment and the section of the live cable for sensing the respective proportion of the motor current.

2. The motor current sensing device as claimed in claim 1, wherein the cable segment and the section of the live cable have substantially identical electrical resistances per unit length.

3. The motor current sensing device as claimed in claim 1, wherein the cable segment and the section of the live cable have substantially identical lengths.

4. The motor current sensing device as claimed in claim 3, wherein the cable segment and the section of the live cable have substantially identical electrical resistances per unit length.

5. The motor current sensing device as claimed in claim 1, wherein the sensor part extends around the cable segment.

6. The motor current sensing device as claimed in claim 1, comprising two cable segments, each cable segment and the section of the live cable having substantially identical electrical resistances.

7. The motor current sensing device as claimed in claim 1, wherein the junctions are spot welded.

8. In an electrical power tool comprising an electrical motor supplied with electrical power via a live cable, over-current protection including a tripping circuit comprising a current sensor associated with the live cable, a method of sensing the motor current for over-current protection, comprising:
   providing at least one cable segment having opposite ends,
   connecting the cable segment at opposite ends in parallel to a section of the live cable across two junctions such that the motor current will be distributed between the cable segment and the section of the live cable in respective proportions, and
   arranging a part of the sensor to extend around one of the cable segment and the section of the live cable for sensing the respective proportion of the motor current.

9. The motor current sensing method as claimed in claim 8, wherein providing at least one cable segment includes choosing the cable segment to have substantially the same electrical resistance per unit length as the section of the live cable.

10. The motor current sensing method as claimed in claim 8, wherein providing at least one cable segment includes choosing the cable segment to have substantially the same length as the section of the live cable.

11. The motor current sensing method as claimed in claim 10, wherein providing at least one cable segment includes choosing the cable segment to have substantially the same electrical resistance per unit length as the section of the live cable.

12. The motor current sensing method as claimed in claim 8, wherein arranging the sensor part includes arranging the sensor part around the cable segment.

13. The motor current sensing method as claimed in claim 8, wherein providing at least one cable segment comprises providing two cable segments having substantially the same electrical resistance as the section of the live cable.

14. The motor current sensing method as claimed in claim 8, wherein connecting the cable segment comprises making the junctions by spot welding.

* * * * *